US012611881B2

(12) United States Patent
Petropoulos et al.

(10) Patent No.: US 12,611,881 B2
(45) Date of Patent: Apr. 28, 2026

(54) PAPER PRECOAT SYSTEM AND METHODS THEREOF

(71) Applicant: XEROX CORPORATION, Norwalk, CT (US)

(72) Inventors: Mark C. Petropoulos, Webster, NY (US); Robert E. Rosdahl, Jr., Ontario, NY (US); Varun Sambhy, Pittsford, NY (US); Jason M. LeFevre, Penfield, NY (US); Seemit Praharaj, Webster, NY (US); Douglas K. Herrmann, Webster, NY (US); Anthony S. Condello, Webster, NY (US); Palghat S. Ramesh, Pittsford, NY (US); Jorge A. Alvarez, Webster, NY (US); Christine A. Steurrys, Williamson, NY (US); Brian Lindstrom, Victor, NY (US); Peter M. Gulvin, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 172 days.

(21) Appl. No.: 18/595,045

(22) Filed: Mar. 4, 2024

(65) Prior Publication Data

US 2025/0276539 A1 Sep. 4, 2025

(51) Int. Cl.
*B41M 5/00* (2006.01)
*B41M 3/00* (2006.01)

(52) U.S. Cl.
CPC .......... *B41M 3/001* (2013.01); *B41M 5/0011* (2013.01); *B41M 5/0017* (2013.01)

(58) Field of Classification Search
CPC ... B41M 3/001; B41M 5/0011; B41M 5/0017
See application file for complete search history.

(56) References Cited

U.S. PATENT DOCUMENTS

2018/0086108 A1* 3/2018 Hojo .................. B41J 11/00214
2018/0244078 A1* 8/2018 Okuda ................. B41M 5/0017

FOREIGN PATENT DOCUMENTS

JP 2013075515 A * 4/2013 .......... B41J 11/0015

* cited by examiner

*Primary Examiner* — Yaovi M Ameh
(74) *Attorney, Agent, or Firm* — MH2 Technology Law Group LLP

(57) ABSTRACT

A precoat application system is disclosed. The precoat application system includes a pressure member configured to apply contacting pressure to a hydrophobic compliant member. A precoat solution, disposed on at least a portion of a surface of the hydrophobic compliant member, is delivered to a surface of paper in contact with the hydrophobic compliant member when the paper is passed between the hydrophobic compliant member and the pressure member. A pressure member is configured to apply pressure to the surface of the paper and the precoat solution on the surface of the paper to obtain a uniform coating of the precoat solution on the surface of the paper. The precoat solution may include an aqueous salt solution, such as magnesium chloride, calcium nitrate, barium, or a combination thereof.

20 Claims, 7 Drawing Sheets

| CGATs File Name | | **AD.Lynx1P_CGATS_IT8_M1** | | | **AD.Lynx3P_CGATS_IT8_M1** | | |
|---|---|---|---|---|---|---|---|
| File ID | | ADLynx1P_CGATS_IT8_M1 | | | ADLynx3P_CGATS_IT8_M1 | | |
| Comments | | | | | | | |
| Data Origin | | *Measurement (abs)* | | | *Measurement (abs)* | | |
| | | | | | | | |
| Profile Analysis: Round Trip error | mean | | | | | | |
| | p95 | | | | | | |
| | | | | | | | |
| | | *L* | *a* | *b* | *L* | *a* | *b* |
| Primaries and Secondaries | C | 64.085 | -23.085 | -45.535 | 63.835 | -22.845 | -45.605 |
| | B | 41.11 | 19.33 | -39.34 | 39.81 | 22.03 | -39.92 |
| | M | 59.67 | 59.5 | -11.815 | 59.24 | 60.235 | -12.095 |
| | R | 58.85 | 50.98 | 32.44 | 58.58 | 51.49 | 34.87 |
| | Y | 91.705 | -9.735 | 71.3 | 91.54 | -9.76 | 72.095 |
| | G | 60.63 | -47.89 | 21.23 | 60.36 | -47.58 | 22.19 |
| | C | 64.085 | -23.085 | -45.535 | 63.835 | -22.845 | -45.605 |
| Black | K | 39.345 | 1.405 | 1.01 | 38.905 | 1.515 | 1.205 |
| | K3(C=Y=M=100) | 40.32 | 2.83 | 2.6 | 39.69 | 3.97 | 3.82 |
| | K4(C=Y=M=K=100) | 32.08 | 1.73 | 1.28 | 30.64 | 1.97 | 1.28 |
| White | W | 94.285 | 1.465 | -7.47 | 94.605 | 1.385 | -7.385 |

FIG. 4B

| AD.Lynx5P_IT8_M1 | | | LynxUntreated_CGATS_IT8_M1 | | |
|---|---|---|---|---|---|
| ADLynx5P_IT8_M1 | | | LynxUntreated_CGATS_IT8_M1 | | |
| | | | | | |
| Measurement (abs) | | | Measurement (abs) | | |
| | | | | | |
| | | | | | |
| | | | | | |
| | | | | | |
| L | a | b | L | a | b |
| 63.87 | -22.925 | -45.76 | 65.015 | -21.325 | -43.97 |
| 39.83 | 22.13 | -39.95 | 50.47 | 7.55 | -34.8 |
| 59.12 | 60.575 | -12.075 | 61.985 | 53.175 | -11.58 |
| 58.44 | 51.76 | 35.21 | 62.28 | 44.9 | 17.31 |
| 91.45 | -9.855 | 72.36 | 91.88 | -9.185 | 64.655 |
| 60.19 | -47.97 | 22.64 | 62.91 | -41.06 | 9.05 |
| 63.87 | -22.925 | -45.76 | 65.015 | -21.325 | -43.97 |
| 38.83 | 1.57 | 1.375 | 43.32 | 1.115 | -0.4 |
| 39.76 | 3.91 | 3.72 | 49.95 | -3.8 | -1.9 |
| 30.54 | 1.84 | 1.32 | 44.01 | 0.16 | 0.16 |
| 94.985 | 1.27 | -7.185 | 94.74 | 1.375 | -7.175 |

FIG. 4C

PAPER PRECOAT SYSTEM AND METHODS THEREOF

TECHNICAL FIELD

The present teachings relate generally to a paper precoat system and, more particularly, to a paper precoat system for an aqueous ink jet printing system.

BACKGROUND

Digital aqueous ink jet (AIJ) printing is an area of growth for several production class printing systems. Printers or consumers of printed materials making or considering a transition from a dry powder (electrophotographic) printing system to an acoustic ink jet printing system or printing press require the maintenance of existing image quality (IQ) and print permanence and durability characteristics while reducing run cost per kiloprint (kp). Exemplary printing systems using the aqueous ink jet printing methods have significantly improved print image quality matching or exceeding current electrophotographic printing methods.

The image quality of aqueous ink images printed onto various types of media varies according to the type of media being printed. Image quality is typically exemplary when the aqueous ink is printed onto offset coated, non-glossy media because the ink remains on top of the coating. Aqueous ink printing onto uncoated, porous media, however, produces washed out, poorer quality images because the inks are absorbed into the fibers of the paper. To avoid this consequence, coatings can be applied to porous media to reduce the absorption of the inks into the media. Primers, also known as precoat solutions, reduce the interaction of the inks with the media since the primer is interposed between the media and the inks. Because the ink image is fixed to the primer layer rather than the media, the ink image can be more easily removed. The ease of ink image removal from media is a significant factor in recycling printed media.

Therefore, it is desirable to develop or design methods or systems to improve image quality, gamut, and deinkability of AIJ prints on uncoated media, which could be a valuable product feature or add-on that opens new opportunities and use of aqueous based ink jet printing systems.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A precoat application system is disclosed. The precoat application system includes a pressure member configured to apply contacting pressure to the hydrophobic compliant member. The precoat application system also includes a precoat solution, disposed on at least a portion of a surface of the hydrophobic compliant member, and where the precoat application system also includes the hydrophobic compliant member is configured to deliver a quantity of precoat solution to a surface of paper in contact with the hydrophobic compliant member when the paper is passed between the hydrophobic compliant member and the pressure member. The precoat application system also includes the pressure member is configured to apply pressure to the surface of the paper and the precoat solution on the surface of the paper to obtain a uniform coating of the precoat solution on the surface of the paper. Implementations of the precoat application system include where the precoat solution may include an aqueous salt solution. The precoat solution may include magnesium chloride, calcium nitrate, barium, or a combination thereof. The precoat solution may include a magnesium chloride solution in water. The precoat solution may include 5% wt to 40% wt of a salt in an aqueous solution. The hydrophobic compliant member may include a roll. The pressure member may include a roll. The precoat application system is combined for use with a digital printer, an offset press, or a combination thereof. The paper may include an uncoated paper. The paper can be in a form of one or more discrete sheets. The precoat solution management subsystem is configured to dispose a measured quantity of a precoat solution on a portion of the hydrophobic compliant member prior to the portion of the hydrophobic compliant member contacting the surface of the paper.

Another precoat application system is disclosed. The precoat application system includes a pressure roll configured to apply pressure to the hydrophobic compliant roll when in contact with the hydrophobic compliant roll. The precoat application system also includes a precoat solution may include an aqueous salt solution, disposed on at least a portion of a surface of the hydrophobic compliant roll, and where the precoat application system includes where the hydrophobic compliant roll is configured to deliver a quantity of precoat solution to a surface of paper in contact with the hydrophobic compliant roll when the paper is passed between the hydrophobic compliant roll and the pressure roll. The precoat application system also includes where the pressure roll is configured to apply pressure to the surface of the paper and the precoat solution on the surface of the paper to obtain a uniform coating of the precoat solution on the surface of the paper.

A method for improving print quality in a printing system is disclosed. The method for improving print quality in a printing system includes passing paper between a hydrophobic compliant member and a pressure member. The method also includes applying a precoat solution may include an aqueous salt solution from the hydrophobic compliant member to a surface of paper. The method also includes applying pressure to the surface of the paper to obtain a uniform coating of the precoat solution on the surface of the paper, and printing an image with an ink on the surface of the paper. Implementations of the method for improving print quality in a printing system includes reacting the precoat solution with a component of the ink to inhibit the ink from permeating the surface of the paper. The method for improving print quality in a printing system may include applying a precoat solution from the hydrophobic compliant member to a surface of paper multiple times prior to printing an image with an ink may include a pigment on the surface of the paper. Applying a precoat solution multiple times increases a quantity of salt from the precoat solution on the surface of the paper. The precoat solution may include magnesium chloride, calcium nitrate, barium, or a combination thereof. The precoat solution may include a magnesium chloride solution in water. The precoat solution may include 5% wt to 40% wt of a salt in an aqueous solution. The ink may include a pigment, a dye, or a combination thereof.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures:

FIGS. 4A-4C depict a series of data demonstrating improved color gamut for prints using a precoat solution, in accordance with the present disclosure.

Figure 1:
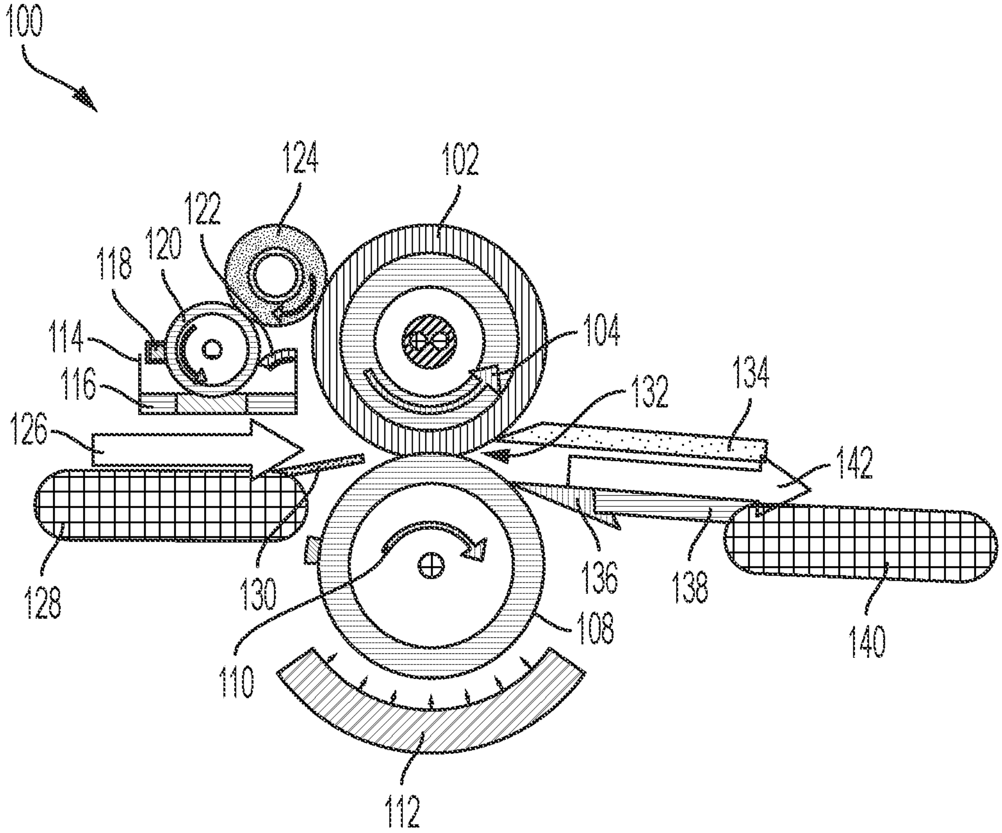
FIG. 1 is a schematic illustrating an exemplary precoat solution application system, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

The apparatus and methods of the present disclosure solves the problem of inconsistent print quality and de-inkability in several production ink jet presses. The use of a coated paper can result in poor ink adhesion and de-inkability, which can also lead to poor print quality. To address this issue, a method and system are proposed to coat paper with a precoat solution using a hydrophobic compliant system under pressure. A surface is hydrophobic when its static water contact angle θ is >90°. The term compliant can refer to the compressibility of the roller or hydrophobic surface layer, which can also be defined as an elastically deformable roll or surface layer, when the hydrophobic layer is present on an application member not including or comprising a roll configuration. In previously known ink jet printing systems, it has been shown that hydrophobic blanket or other surfaces have been used, but provided unreliable coatings on these surfaces due to the inherent incompatibility of water-based materials and hydrophobic surfaces. Without being bound to any particular theory, it is believed that the combination of metering a consistent amount of a primer or precoat solution by the precoat application system in combination with pressure of a compliant, hydrophobic application member provide a metered, consistent layer of a precoat or primer solution to a surface of a printable substrate to enable improved image quality in exemplary printing systems of the present disclosure. The precoat solution, also referred to as a precoat composition, precoat, primer, or primer solution, can include an aqueous salt solution that improves ink adhesion and de-inkability by "crashing" the ink pigment portion of the ink composition and preventing it from sinking or diffusing into the bulk of the paper. As used in this document, the term "primer" or "precoat" can be defined as coatings or solutions that are applied to media to improve the image quality of the ink images over that which is achieved without the coatings. The use of a salt solution as a precoat solution has several advantages, including low material cost and the ability to improve print quality on both coated and uncoated paper. The effect of "crashing," precipitating, or causing the precipitation of a component of an ink can include any single chemical or combination of chemicals in relation to a printed ink or other printing related fluid that can facilitate the desolubilization or precipitation of one or more components in the ink. The desolubilizing can be accomplished by proton transfer from collision or close proximity of a crashing agent with one or more of the ink components. The desolubilizing can be caused by component associations induced by a combination of a precoat solution and/or component associations occurring with the precoat solution.

The mechanism by which the aqueous precoat solution crashes or causes the precipitation of the ink pigments at the surface is alternatively reasoned to be via the breaking of the surface tension of the ink which causes the pigments, dyes, or other components to precipitate and adhere to the surface of the paper. The use of a hydrophobic compliant roller system under pressure improves the application of the precoat solution by providing a uniform and consistent coating of the solution on the paper. The roller applies pressure to the solution, which helps to evenly distribute the solution, thus ensuring that the solution sufficiently covers all areas of the paper. For the purposes of this disclosure, any suitable print media, such as paper or another printable substrate, such as, but not limited to coated paper, uncoated paper, plastic films, plastic sheets, fabrics, or other printable materials can be used interchangeably. Typically, when a precoat solution, primer, ink or other material is deposited on a substrate, a first side of the substrate is commonly facing the hydrophobic compliant application member, the printheads or any other printing system component that modifies the first side or first surface of the substrate or paper. A second side may subsequently undergo a similar process, during which time it may be considered as a second side of a substrate or paper, which is a common practice when printing in duplex mode for a printing system.

Potential drawbacks or limitations of using a salt solution as a precoat solution can include the possibility of damaging the paper if too much salt is applied, or too high a content of salt is included in the salt solution, leading to the possibility of the solution being or becoming too concentrated, thus causing the ink density to increase. The precoat solution can be adjusted to improve its effectiveness on different types of paper by varying the concentration of the salt solution and the number of passes through the system. The number of passes through the system can affect the amount of salt in the precoat solution by increasing the concentration of the solution on the surface of the paper.

Precoat solutions of the present teachings may alternatively be used with other types of inks, such as dye-based inks, but the aqueous precoat solutions may not be as effective in improving the quality of the print. The precoat solution can be compared to other pre-coating methods, such as those used in competitive products, by providing a simpler and more cost-effective solution. It also provides improved IQ metrics and de-inking capabilities.

In examples, the precoat solution and application system can be used with other types of paper surfaces, substrates, or coatings, such as UV coatings or laminates, but it may not be as effective in improving the quality of the print as when used with uncoated papers. The use and application of a precoat solution can impact the print quality and durability of the final print by improving the IQ metrics and de-inking capabilities, which can lead to a higher-quality print. The precoat solution may be used with different types of printing equipment, such as digital printers or offset presses, but it may require some modifications to the equipment to ensure that it works effectively in such equipment.

While existing image quality (IQ) metrics such as line edge quality, streakiness and graininess are acceptable on certain papers, as printed by printing systems of the present disclosure, the use of a coating on papers or pre-coated papers can result in degraded IQ due to differences in the way ink spreads and soaks into the paper as compared to uncoated papers or in areas of coated papers. A system and method of applying a precoat solution can be used provide a precoat solution and thereby improve print quality and associated IQ metrics.

FIG. 1 is a schematic illustrating an exemplary precoat solution application system, in accordance with the present disclosure. To effectively coat paper with a precoat solution the use of a hydrophobic compliant roll while applying pressure to obtain a uniform coating of the precoat solution on the paper can be employed. In examples, the precoat solution is an aqueous salt solution. Once coated on the paper the precoat solution crashes the ink pigment and prevents the ink from sinking into paper. A precoat solution application system 100 is shown in FIG. 1 and includes a hydrophobic, compliant application roll 102, which rotates in an application roll rotational direction 104, and a pressure roll 108, configured to rotate in a pressure roll rotational direction 110. While these directions of rotation or processing are shown, other examples of the precoat solution application system 100 can rotate in alternate directions, depending on overall machine configuration. Also associated with the precoat solution application system 100 is the inclusion of a pressure roll cooler 112 in proximity to the pressure roll 108. In examples, the precoat solution application system 100 can include a precoat solution reservoir 114, which is configured to contain and store a quantity of precoat solution 116. The precoat solution reservoir 114 can optionally include a sensor 118 which can detect or evaluate the quantity or quality of precoat solution within the precoat solution reservoir 114. The precoat solution 116 can be distributed from the precoat solution reservoir 114 with the use of a precoat solution metering roll 120. As the precoat solution metering roll 120 rotates, it is configured to pick up precoat solution 116 from the precoat solution reservoir 114. This can be enabled by the material or surface characteristics of the precoat solution metering roll 120, which can be textured, roughened, coated, or designed similar to a gravure roll, where it is specifically textured to pick up or hold a fluid within its surface. In proximity to the precoat solution metering roll 120 is a metering blade 122, which can be adjusted such that it is in contact with or placed in close proximity to a surface of the precoat solution metering roll 120 to regulate or meter the amount of fluid retained or picked up by the precoat solution metering roll 120 as it rotates within the precoat solution reservoir 114. In contact with the precoat solution metering roll 120 is a donor roll 124 which further splits or reduces the layer of precoat solution from the precoat solution metering roll 120 and delivers it to the compliant application roll 102. In such an example, the precoat solution management subsystem can include a precoat solution reservoir 114 containing a quantity of precoat solution 116, a precoat solution metering roll 120 in contact with the precoat solution 116 in the precoat solution reservoir 114, a precoat solution metering blade 122 in contact with the precoat solution metering roll 120, and a precoat solution donor roll 124 in contact with the precoat solution metering roll 120 and the hydrophobic compliant member 102. Thus, this system is configured to dispose a measured quantity of a precoat solution 116 on a portion of the hydrophobic compliant member 102 prior to the portion of the hydrophobic compliant member 102 contacting the surface of the paper 130.

Associated with the precoat solution application system 100 are other parts of the printing system, including a paper entrance 126, a paper transport belt 128, the paper 130 entering the compression nip or application nip 132 formed by the compliant application roll 102 and the pressure roll 108. In examples, the application nip can be formed by providing contact pressure between the application roll 102 and the pressure roll 108. The nip formed in this manner includes a nip width which is a uniform (across a roll or member) and consistent region of contact formed under pressure conditions when a substrate passes through the nip. The nip width useful in a precoat application system of the present teachings can be from about 2 mm to about 6 mm. This uniform and consistent pressure enables the precoat solution to be effectively and completely transferred onto the first surface of the substrate or paper. Also shown are the exit paper guide 134, an air knife 136 for enabling stripping of paper with precoat solution applied 138, an exit paper transport 140 along a paper exit path 142. It should be noted that any of the rolls shown can alternatively be provided as belts or other application devices that can still perform the similar function as the components depicted.

In essence, the precoat application system shows the hydrophobic compliant member, and a pressure member configured to apply contacting pressure to the hydrophobic compliant member, and a precoat solution, disposed on at least a portion of a surface of the hydrophobic compliant member, wherein the hydrophobic compliant member is configured to deliver a quantity of precoat solution to a surface of paper in contact with the hydrophobic compliant member when the paper is passed between the hydrophobic compliant member and the pressure member, and the pressure member is configured to apply pressure to the surface of the paper and the precoat solution on the surface of the paper to obtain a uniform coating of the precoat solution on the surface of the paper. In examples, the precoat solution can include an aqueous salt solution. For example, the precoat solution can include magnesium chloride, calcium nitrate, barium, any water soluble salt of $Ca^{2+}$, $Mg^{2+}$, $Ba^{2+}$, $B^{3+}$, $Al^{3+}$, or combinations thereof. In essence, divalent or trivalent cations are the active species included in a precoat solution. They destabilize one or more of the ink components, colloids, latex, pigments, and the like, and cause them to precipitate out of suspension or dispersion within the ink composition. A representative primer, primer solution, or precoat solution composition can be found in Table 1. All values are represented in % by weight of a total precoat solution or primer composition.

TABLE 1

Representative Precoat (Primer) Solution Composition

| Chemical | Amt in 1 kg | % by wt | Suitable Range (% by wt) |
|---|---|---|---|
| Glycerol | 21.8 | 2.2 | 0-5 |
| Propylene Glycol, (can also include other cosolvents like butanediol, pentanediol, hexanediol, glycol ethers like diethylene glycol monoethyl ether, dipropylene glycol methyl ether, similar to cosolvents that may be present in ink formulations) | 197.7 | 19.8 | 10-40 |
| Water | 509 | 50.9 | 30-70 |
| Magnesium Nitrate Hexahydrate (can also include other metal salts as described herein) | 270 | 27.0 | 10-50 |
| Surfactant TT4000 | 7 | 0.7 | 0.1-3 |
| Biocide Proxel | 1.45 | 0.1 | 0.1-1 |

In an example, the precoat solution comprises a magnesium chloride solution in water, where in any case, the precoat solution can include 5% wt to 40% wt of a salt in an aqueous solution based on a total weight of the aqueous solution. Other examples include from about 1% wt to about 50% wt, or from about 10% wt to about 50% wt, or from about 10% wt to about 20% wt of a salt in an aqueous solution based on a total weight of the aqueous solution.

In examples, the precoat application system can be combined for use with a digital printer, an offset press, or a combination thereof. For example, the precoat application system can be paired in a separate module with any type of printing system. Furthermore, the precoat application system can be used to precoat paper, and then printed at a later time, which need not be immediately after precoating. The paper can include uncoated paper or coated paper, or paper in the form of one or more discrete sheets, or alternatively in a continuous web format.

This system enables the conduction of a method for improving print quality in a printing system, which includes passing paper between a hydrophobic compliant member and a pressure member, applying a precoat solution comprising an aqueous salt solution from the hydrophobic compliant member to a surface of paper, and applying pressure to the surface of the paper to obtain a uniform coating of the precoat solution on the surface of the paper, and printing an image with an ink on the surface of the paper. The method can further include reacting the precoat solution with a component of the ink to inhibit the ink from permeating the surface of the paper, i.e., crashing the ink. In examples of the method, the precoat solution can be applied from the hydrophobic compliant member to a surface of paper multiple times prior to printing an image with an ink comprising a pigment on the surface of the paper. In such cases, applying a precoat solution multiple times increases a quantity of salt from the precoat solution on the surface of the paper, by concentrating the precoat solution on the surface of the paper. In examples, the ink used for printing can include a pigment, a dye, solvents, water, or a combination thereof. An additional characteristic can include where the precoat or primer has a lower surface tension as compared to the ink. The difference, in examples, can be at least >0.1 mN/m or ≥1 mN/m. In some examples, the precoat solution can be applied to paper prior to printing, or even after printing at least one ink composition onto the surface of the paper. The resulting prints have improved image quality metrics such as gamut, graininess, and deinkability on different types of paper. Other examples can include where the precoat solution is applied using a gravure roller or a fuser roller, the precoat solution is used in combination with other types of coatings, such as UV coatings or laminates. In examples, the paper comprises no surface coating prior to being passed through the precoat application system, and the number of passes through the precoat solution application system affects the amount of salt in the precoat solution remaining on the surface of the paper. Paper types useful in combination with precoat application systems and methods of the present disclosure can include coated paper, glossy paper, uncoated paper, recycled paper. In addition, paper with a low or high fiber content, smooth or textured surfaces, matte surfaced-paper, paper with a high or low brightness, papers having higher or lower weights, high opacity or low opacity. In other examples, a dryer may be used to accelerate processing time and more expediently dry the precoat solution on paper surfaces. Systems and application methods described herein can improve gamut and graininess on nonglossy papers and help with deinking on all types of prints (gloss and nonglossy). To test this, an exemplary precoat solution application system was used to run paper through the system with multiple passes, up to five passes. The precoat solution coated papers were subsequently printed on an ink jet production printer. The prints were then analyzed for gamut and gloss and mottle along with blank sheets measured for salt content.

Figure 2:
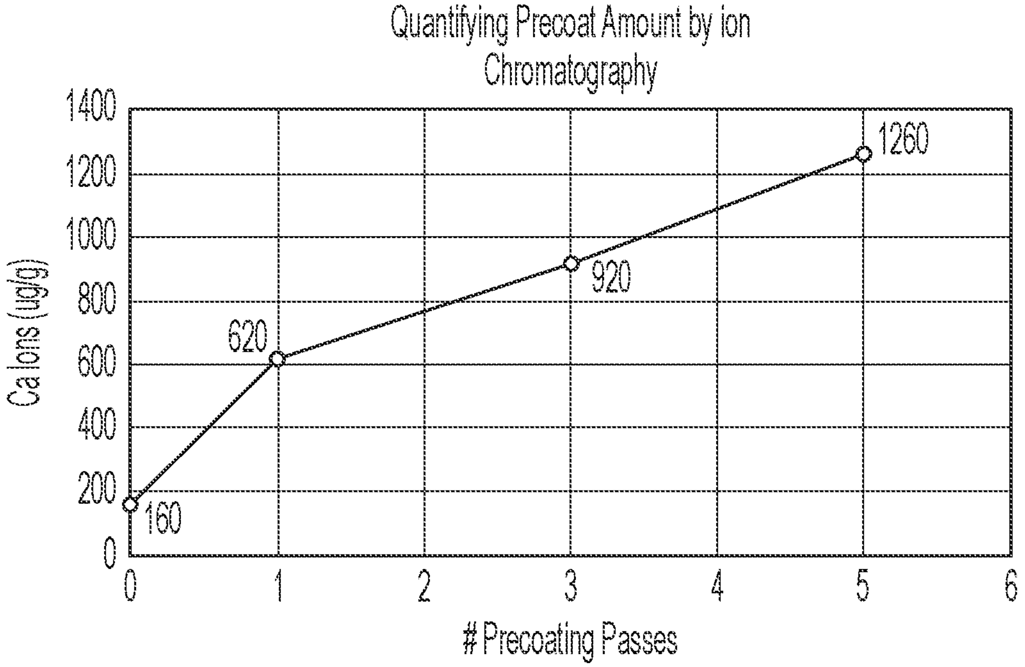
FIG. 2 is a plot depicting a quantity of precoat composition applied to paper as a function of the number of passes of paper through a precoat solution application system, in accordance with the present disclosure.

FIG. 2 is a plot depicting a quantity of precoat composition applied to paper as a function of the number of passes of paper through a precoat solution application system, in accordance with the present disclosure. Ion chromatography was used to analyze a quantity of calcium ion left on the surface of paper when passed through a system of the present disclosure a number of times. The x-axis of the plot designates a number of passes a paper sample passed through the precoat solution application system. The precoat solution included a calcium salt, and the data demonstrates that quantity of calcium, as expressed in calcium ions in μg/g increased with successive numbers of passes through the precoat solution application system.

Figure 3A:
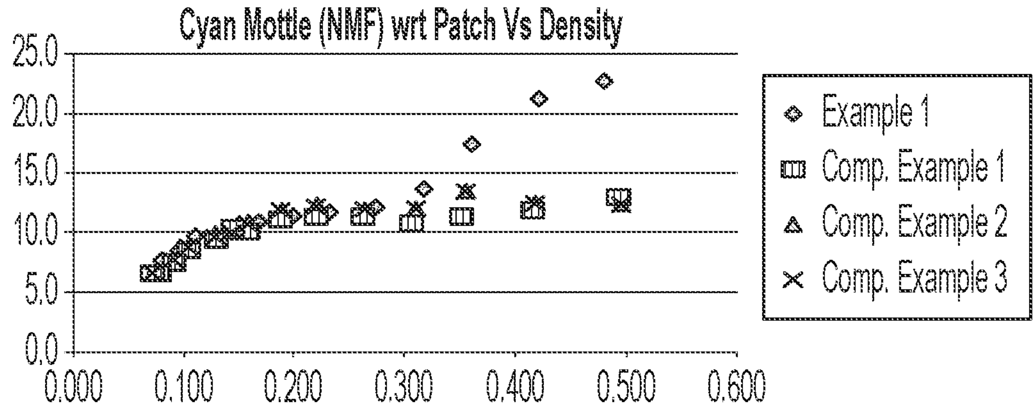
FIGS. 3A and 3B depict a series of plots demonstrating various image quality metrics for prints using a precoat solution, in accordance with the present disclosure.
Figure 3A:
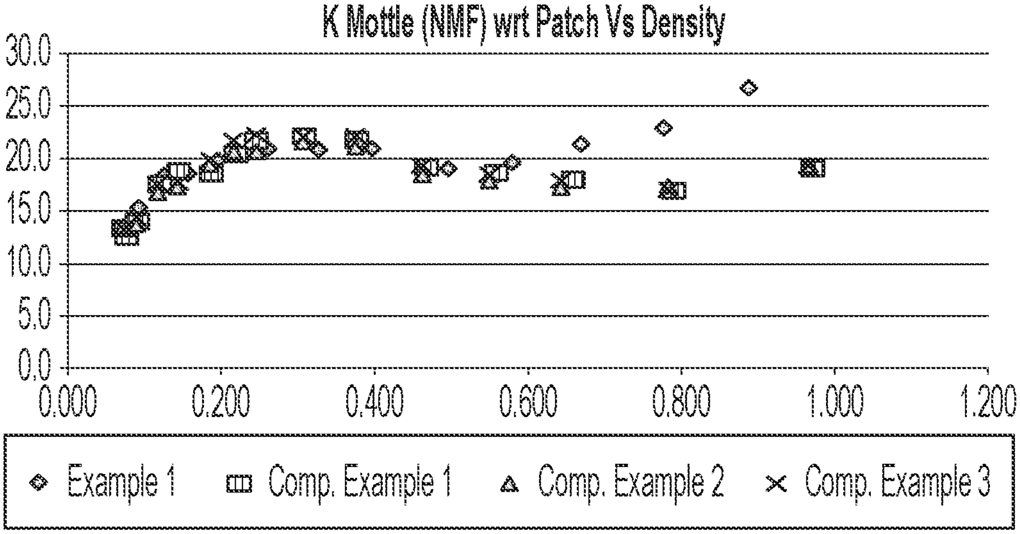
Figure 3A:
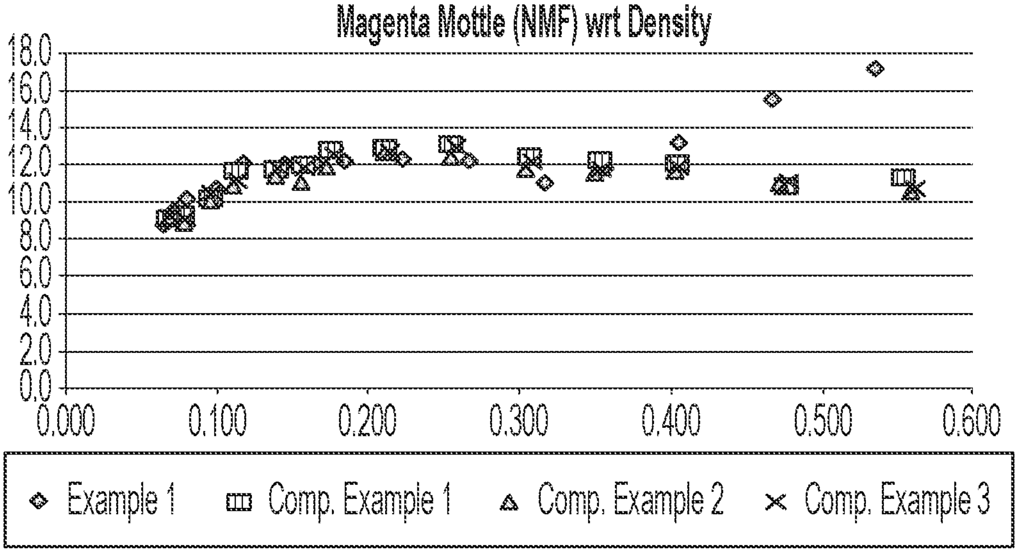
Figure 3B:
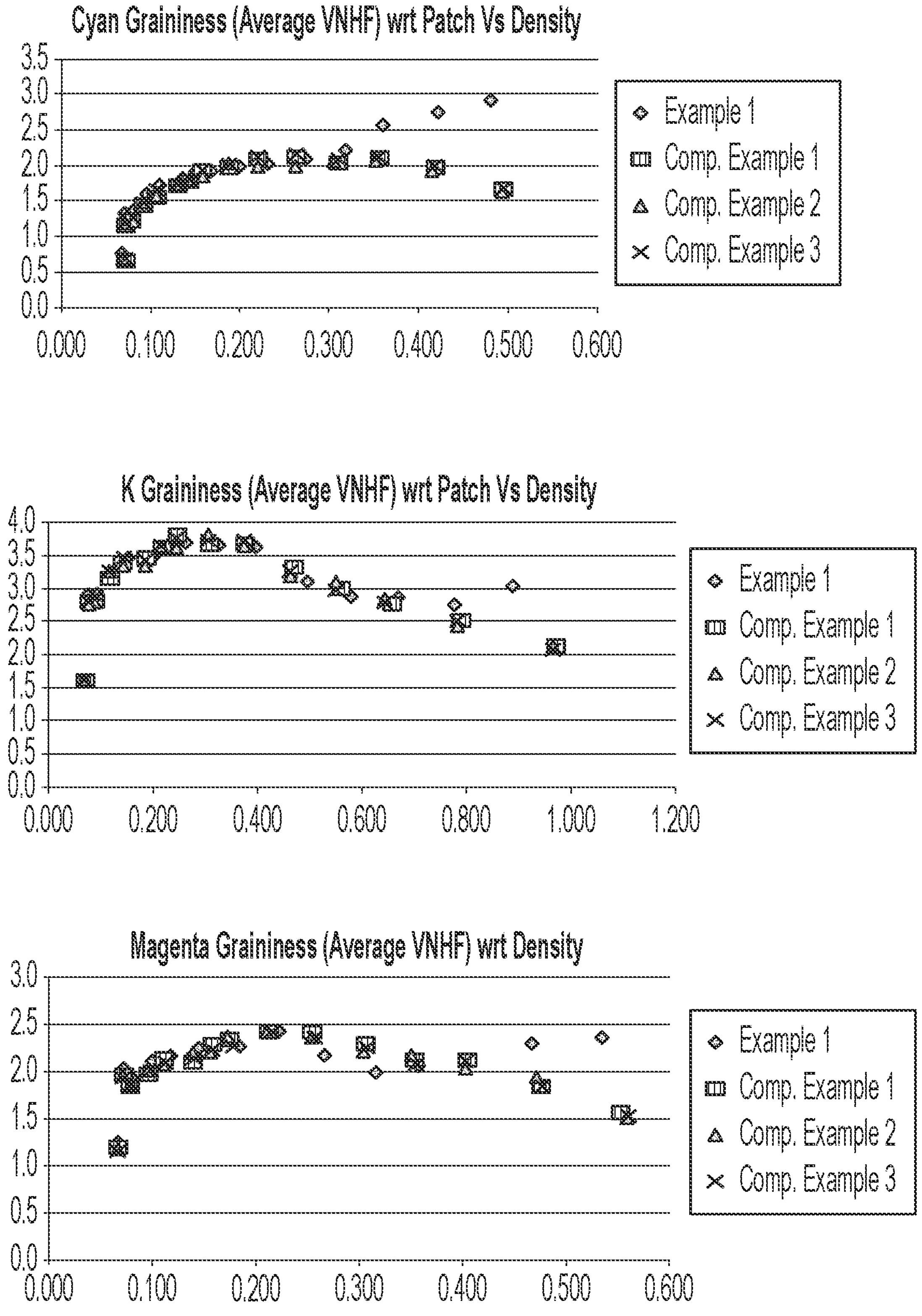

FIGS. 3A and 3B depict a series of plots demonstrating various image quality metrics for prints using a precoat solution, in accordance with the present disclosure.

The plots in FIGS. 3A and 3B, respectively, demonstrate that both mottle and graininess metrics were improved and only required 1 pass of pretreatment solution, as shown in the data for Example 1. Print mottle can be caused by uneven ink or non-uniform ink absorption across the paper surface. Print mottle can be perceived as a spotty, non-uniform appearance in solid printed areas. Graininess, which can be referred to as graininess of halftones is a printing defect characterized by an uneven tone pattern in halftone dots. Graininess can be caused by non-uniform ink absorbency across a paper surface. In comparing Example 1 (no precoat) with Comparative Example 1 (1 pass precoat), Comparative Example 2 (3 pass precoat), and Comparative Example 3 (5 pass precoat), it can be shown that the results of the present disclosure in Example 1 shows improvements in comparison to the data associated with Comparative Example 1, Comparative Example 2, and Comparative Example 3.

Figure 4A:
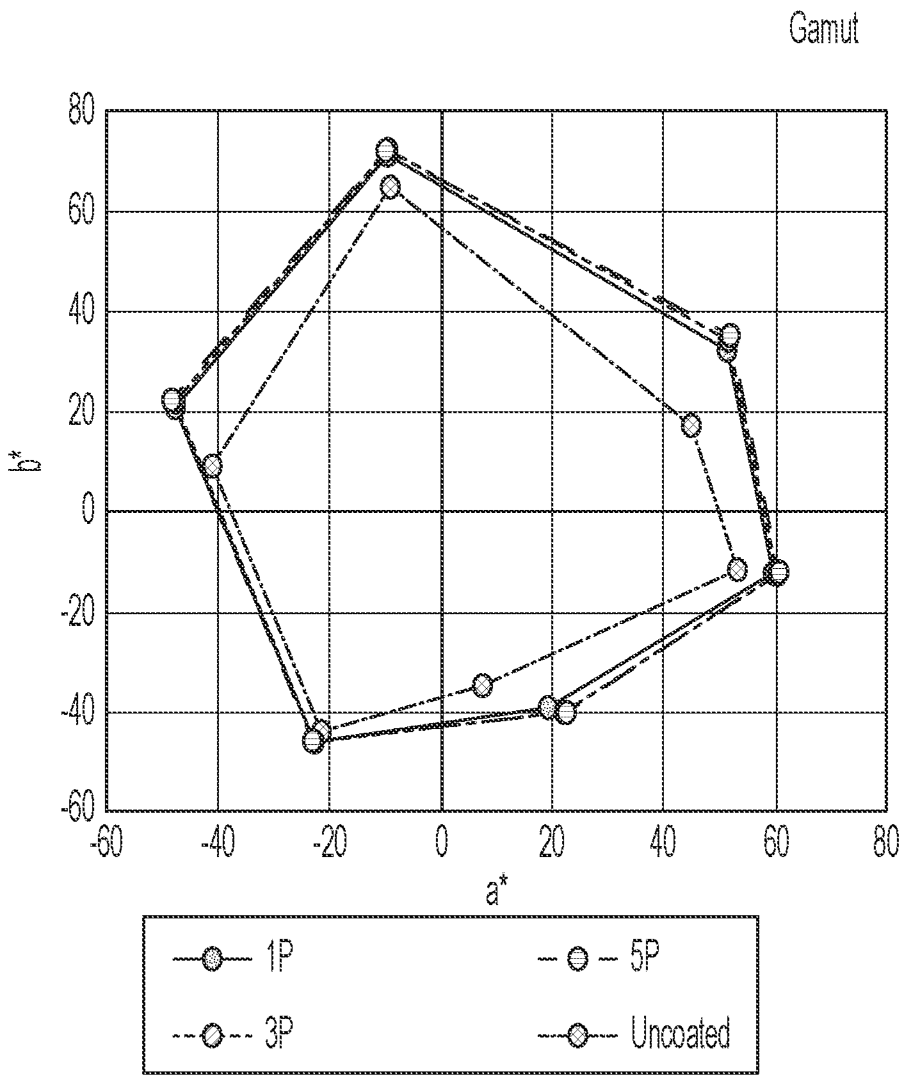

FIGS. 4A-4C depict a series of data demonstrating improved color gamut for prints using a precoat solution, in accordance with the present disclosure. As shown in FIG. 4A a graphical representation of the color gamut associated with an Uncoated sample, a sample with one pass of precoat solution according to the present disclosure (1P), a sample with three passes of precoat solution (3P), and five passes of precoat solution (5P) show an improvement in perceptible color gamut. Color gamut can be defined as a range of colors which a particular device can produce or record. A larger area shown in a graphical representation can be interpreted as a wider or more expansive color gamut. As shown in FIG. 4A, the gamut was improved and only required 1 pass. Details and specific conditions for gamut measurements are depicted in tables shown in FIGS. 4B and 4C. The designations in each label as untreated, 1P, 3P, and 5P correspond to papers having no passes through the precoat application system, one pass, three passes, and five passes, respectively.

The overall results obtained were initially unexpected given the application roll is hydrophobic and the precoat is an aqueous solution and still able to deposit a uniform thin layer of the precoat solution on the paper after going through the nip formed by the application member and the pressure member. Advantages of the system of the present disclosure include a simplified method to coat paper media with a precoat solution. Simple salt aqueous solutions can further be used keep the material cost low. For example, a salt solution, for example, magnesium chloride, is understood to crash or desolubilize one or more colloids or other components in the ink composition, causing them to precipitate. Additional salts that can be used include calcium salts and cations with divalent, trivalent or polyvalent cations as examples, such as calcium nitrate, and other metal salts as described herein. Other additives or ingredients of the precoat solution can include glycerol or other additives, such as surfactants for the purpose of lowering surface tension below that of a corresponding ink formulation. Surfactants can include Dynol™ 607 and Tego® Twin 4000, and the like, or combinations thereof. Other surfactants known in the art may also be used.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A precoat application system, comprising:
a hydrophobic compliant member;
- a pressure member configured to apply contacting pressure to the hydrophobic compliant member; and
- an aqueous precoat solution, disposed on at least a portion of a surface of the hydrophobic compliant member; and wherein:
- the surface of the hydrophobic compliant member has a static water contact angle of greater than 90°;
- the precoat application system is configured to deliver a quantity of precoat solution to a first surface of a substrate in contact with the hydrophobic compliant member when the substrate is passed between the hydrophobic compliant member and the pressure member;
- the pressure member is configured to apply pressure to the first surface of the substrate and the precoat solution on the first surface of the substrate to obtain a uniform coating of the precoat solution on the first surface of the substrate; and
- the aqueous precoat solution has a static surface tension lower than a static surface tension of an ink to be printed onto the substrate.

2. The precoat application system of claim 1, wherein the aqueous precoat solution comprises a salt solution.

3. The precoat application system of claim 1, wherein the aqueous precoat solution comprises magnesium chloride, calcium nitrate, barium, or a combination thereof.

4. The precoat application system of claim 1, wherein the aqueous precoat solution comprises a magnesium chloride solution.

5. The precoat application system of claim 1, wherein the aqueous precoat solution comprises 5% wt to 40% wt of a salt in a solution.

6. The precoat application system of claim 1, wherein the hydrophobic compliant member comprises a roll.

7. The precoat application system of claim 1, wherein the pressure member comprises a roll.

8. The precoat application system of claim 1, wherein the precoat application system is combined for use with a digital printer, an offset press, or a combination thereof.

9. The precoat application system of claim 1, wherein the substrate comprises an uncoated paper.

10. The precoat application system of claim 1, wherein the substrate is in a form of one or more discrete sheets.

11. The precoat application system of claim 1, further comprising:
a precoat solution management subsystem comprising:
- a precoat solution reservoir containing a quantity of aqueous precoat solution;
- a precoat solution metering roll in contact with the precoat solution in the precoat solution reservoir;

a precoat solution metering blade in contact with the precoat solution metering roll; and a precoat solution donor roll in contact with the precoat solution metering roll and the hydrophobic compliant member; and wherein the precoat solution management subsystem is configured to dispose a measured quantity of the aqueous precoat solution on a portion of the hydrophobic compliant member prior to the portion of the hydrophobic compliant member contacting the first surface of the substrate.

12. A precoat application system, comprising:

a hydrophobic compliant roll;

a pressure roll configured to apply pressure to the hydrophobic compliant roll when in contact with the hydrophobic compliant roll; and an aqueous precoat solution comprising a salt solution, disposed on at least a portion of a surface of the hydrophobic compliant roll; and wherein:

the surface of the hydrophobic compliant roll has a static water contact angle of greater than 90°;

the precoat application system is configured to deliver a quantity of aqueous precoat solution to a first surface of a substrate in contact with the hydrophobic compliant roll when the substrate is passed between the hydrophobic compliant roll and the pressure roll; and the pressure roll is configured to apply pressure to the first surface of the substrate and the aqueous precoat solution on the first surface of the substrate to obtain a uniform coating of the aqueous precoat solution on the first surface of the substrate; and the aqueous precoat solution has a static surface tension lower than a static surface tension of an ink to be printed onto the substrate.

13. A method for improving print quality in a printing system, comprising:

passing a substrate between a hydrophobic compliant member and a pressure member;

applying an aqueous precoat solution comprising a salt solution from the hydrophobic compliant member to a first surface of the substrate; and applying pressure to the first surface of the substrate to obtain a uniform coating of the aqueous precoat solution on the first surface of the substrate; and printing an image with an ink on the surface of the substrate wherein:

the surface of the hydrophobic compliant member has a static water contact angle of greater than 90°; and the aqueous precoat solution has a static surface tension lower than a static surface tension of an ink to be printed onto the substrate.

14. The method for improving print quality in a printing system of claim 13, further comprising reacting the aqueous precoat solution with a component of the ink to inhibit the ink from permeating the first surface of the substrate.

15. The method for improving print quality in a printing system of claim 13, further comprising applying the aqueous precoat solution from the hydrophobic compliant member to a first surface of the substrate multiple times prior to printing an image with an ink comprising a pigment on the first surface of the substrate.

16. The method for improving print quality in a printing system of claim 15, wherein applying the aqueous precoat solution multiple times increases a quantity of salt from the precoat solution on the first surface of the substrate.

17. The method for improving print quality in a printing system of claim 13, wherein the aqueous precoat solution comprises magnesium chloride, calcium nitrate, barium, or a combination thereof.

18. The method for improving print quality in a printing system of claim 13, wherein the aqueous precoat solution comprises a magnesium chloride solution.

19. The method for improving print quality in a printing system of claim 13, wherein the aqueous precoat solution comprises 5% wt to 40% wt of a salt in a solution.

20. The method for improving print quality in a printing system of claim 13, wherein the ink comprises a pigment, a dye, or a combination thereof.

* * * * *